Figure 7:
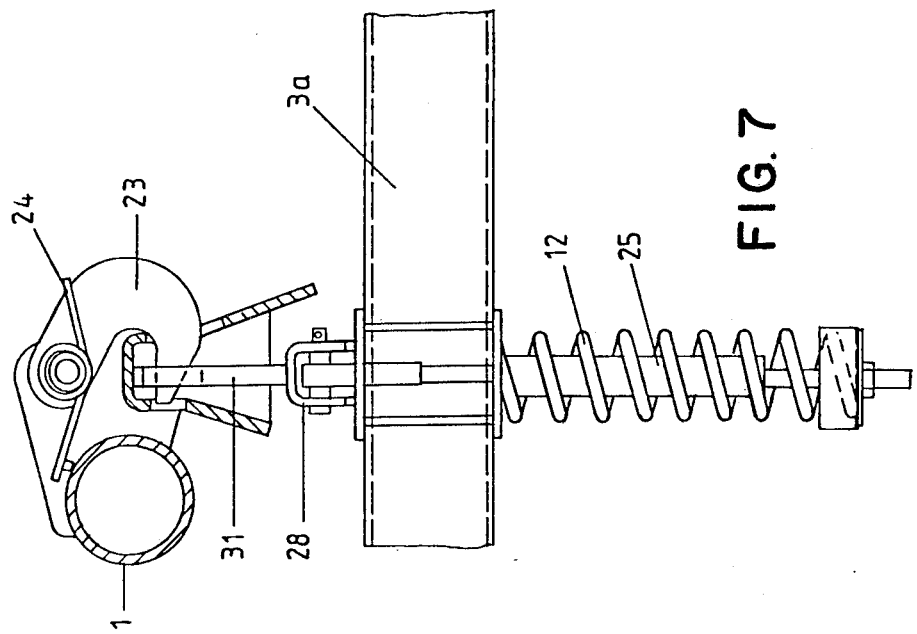

United States Patent [19]

Maier et al.

[11] 4,432,192
[45] Feb. 21, 1984

[54] MOWER

[75] Inventors: Martin Maier, Gottmadingen; Hermann Ruprecht, Singen, both of Fed. Rep. of Germany

[73] Assignee: Klockner-Humboldt-Deutz AG, Gottmadingen, Fed. Rep. of Germany

[21] Appl. No.: 407,919

[22] Filed: Aug. 13, 1982

[30] Foreign Application Priority Data

Aug. 31, 1981 [DE] Fed. Rep. of Germany ....... 3134389

[51] Int. Cl.³ .......................................... A01D 35/264
[52] U.S. Cl. ..................................... 56/15.3; 56/10.4; 56/15.7
[58] Field of Search ................... 56/6, 10.4, 13.6, 13.7, 56/15.5, 15.7, 15.3, 192, 255, 292, 295; 172/264, 265, 269, 705

[56] References Cited

U.S. PATENT DOCUMENTS

| 636,342 | 11/1899 | Lambert | 172/265 |
|---|---|---|---|
| 2,478,591 | 8/1949 | Miller | 56/DIG. 14 |
| 3,110,146 | 11/1963 | Latshaw | 56/15.3 |
| 4,253,294 | 3/1981 | Zweegers | 56/13.6 |

Primary Examiner—Gene Mancene
Assistant Examiner—David L. Tarnoff
Attorney, Agent, or Firm—Laurence R. Brown

[57] ABSTRACT

A mower has a mower support mount beam with at least one rotating mowing device as well as a flexible coupling to a carrying mount beam and a hitching mount. The carrying mount, when the machine is moving forward is in front of the mower support mount and above it. A latching mechanism is supplied for the carrying mount beam which includes a biased spring member and a movable intermediate member which projects into a clasping pocket of the carrying mount beam so that a swinging locking clasp which has a pull cord thereon can grip it.

2 Claims, 8 Drawing Figures

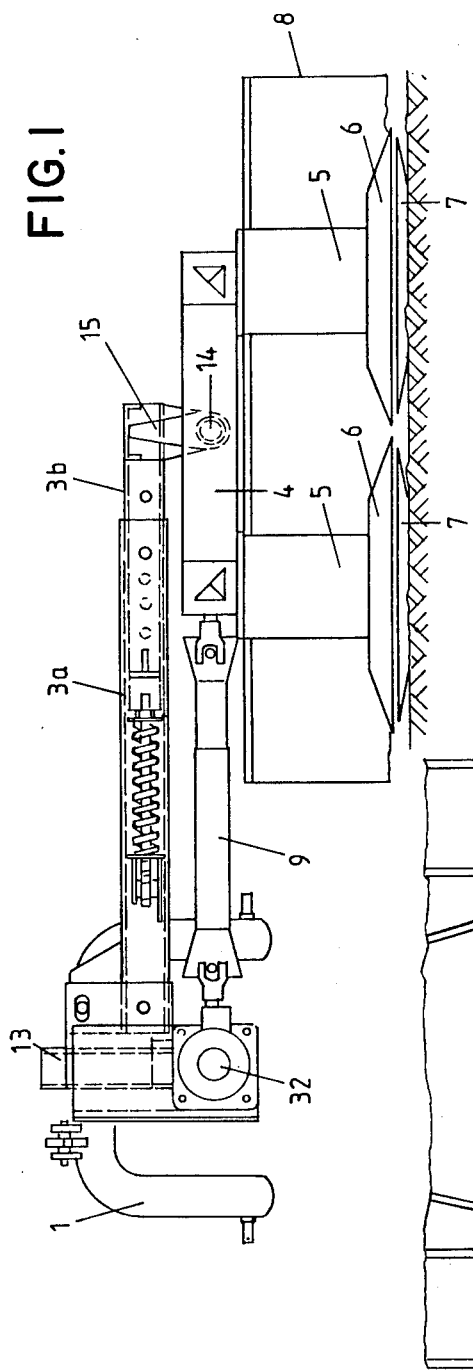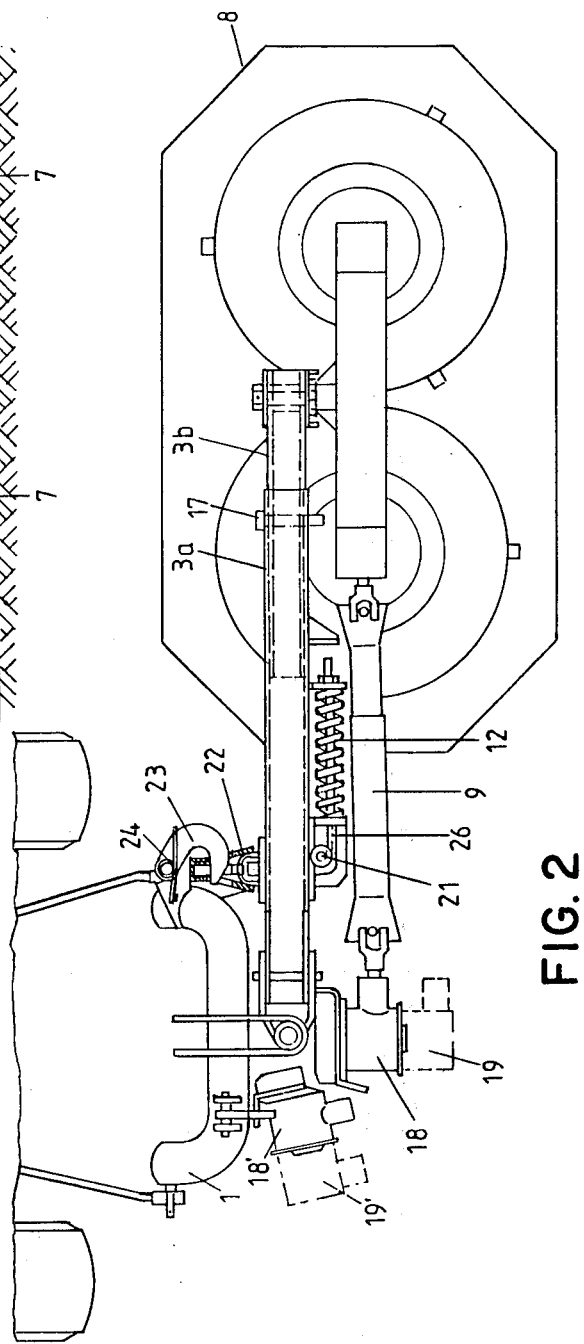

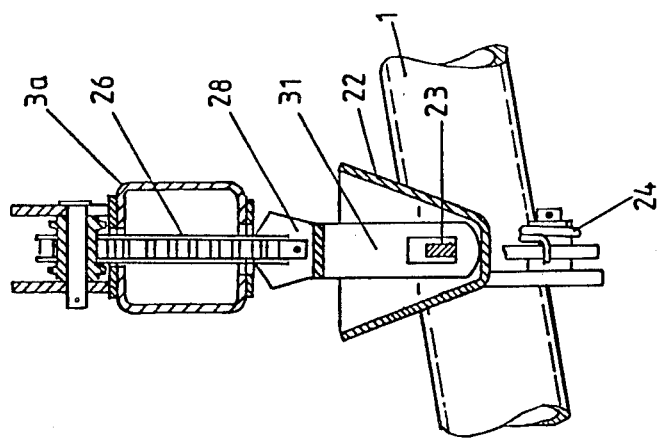
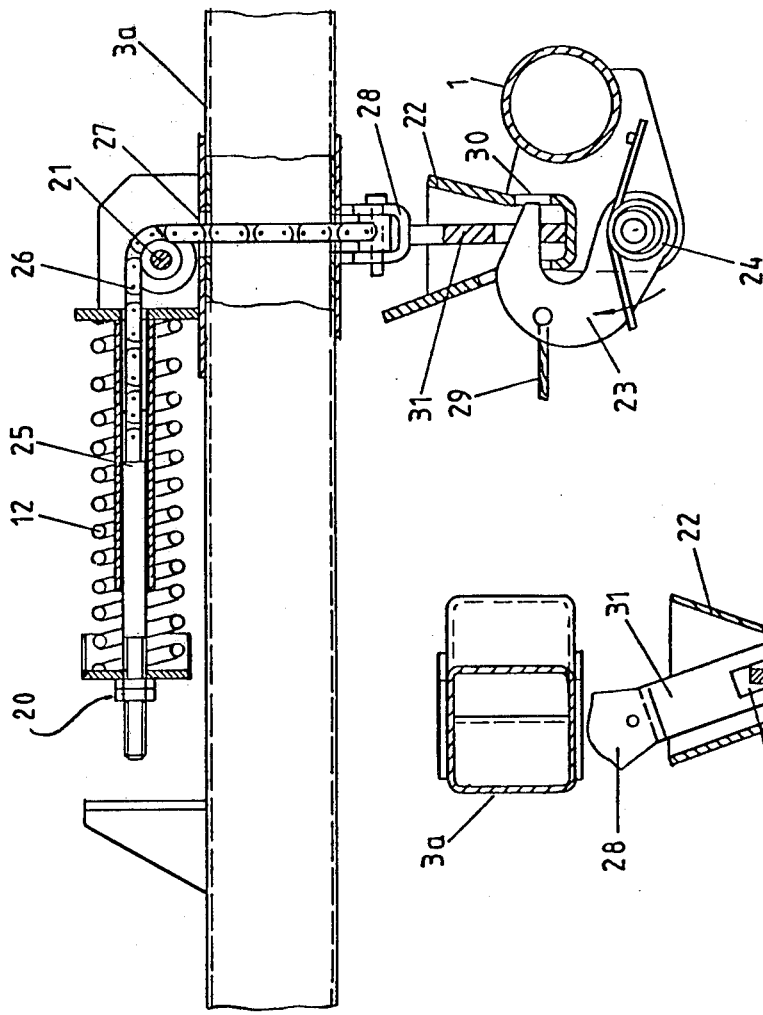

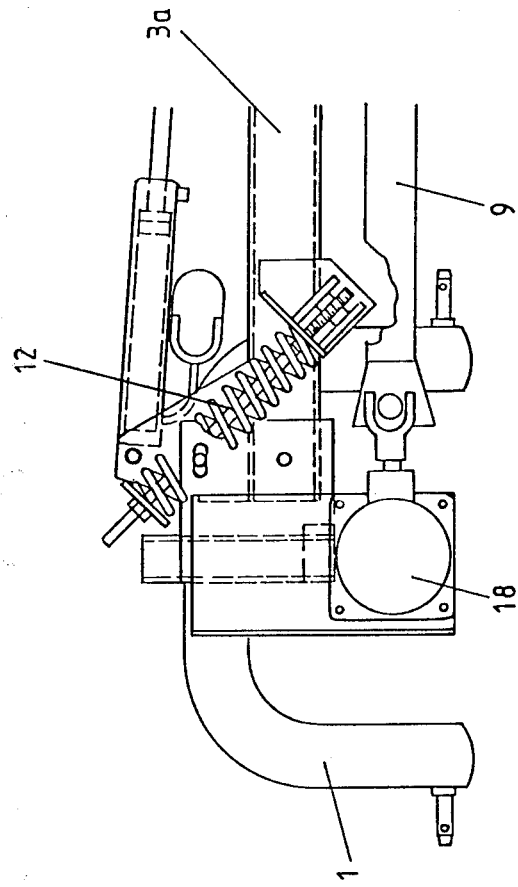

MOWER

TECHNICAL FIELD

This invention relates to a mower with a mower supporting mount which carries at least one rotating mowing device on its underside flexibly coupled with a carrying mount beam and a hitching mount to a tractor, wherein the carrying mount beam in the forward movement of the mower is positioned in front of and above the mower supporting mount.

BACKGROUND ART

Such machines, which in the working position of the carrying beam the mower supporting mount is positioned generally perpendicular to the forward movement of the machine, are commonly known. Since mowers considerably extend beyond the greatest width of the tractor, there must be a reduction in width in order to transport in a transport position, which generally is accomplished by means of a horizontal swinging behind the tractor about a vertical pivot axis. In order to swing into the working position the mower must be locked in place, since it otherwise freely swings back and forth between its working and transport positions.

If the mower encounters an obstacle in its working position, to avoid heavy damage, it may be swung into its transport position. In European Pat. No. 0022283 this object is already made known, which has a mowing device attached to a mounting beam that is upwardly swingable about a pivot axle, so that before striking an obstacle the mower device carrying beam can swing against the bias of a spring mechanism.

With such swinging action caused before encountering small masses, a part of the mower must act before the encounter with an obstacle, since otherwise damage to the carrier beam follows unless the action avoiding the smallest impact is followed. Further this known apparatus of the tractor together with the suspended mower thereon must be backed up in order to be freed from an obstacle.

Further known from German Pat. No. 749 281 is a swinging cutting device for a tractor mower, which is pointed behind the tractor at an angle to the forward direction. Upon striking an obstacle then the mowing unit swings backwards with the cutting device about a perpendicular pin horizontally a small amount, which results by means of the sliding or transverse motion fixed by two kinds of sliding rods coupled together.

With this known cutting unit, after overcoming the obstacle, the cutting unit must be returned by the driver by hand to its original mowing position.

Furthermore spring biased safety apparatus for mowers is known which permits a release and return swing of the machine whenever an obstacle is encountered. This safety apparatus is customarily initiated by hand before mowing begins. This introduces the disadvantage that the operating person must stand between the rear of the tractor and the mower unit in order to operate the safety member. This introduces a significant danger of accident.

If one of these known safety mowers strike an obstacle with too heavy a blow, then the safety element is prevented from reaching its attainable force and the mower swing is stopped until a blow is encountered in its transport position. By permitting a blow of very high force to appear during the movement stroke, a single part can be destroyed.

BRIEF DESCRIPTION OF THE INVENTION

An object of the present invention is to provide a mower which overcomes the aforesaid problems and reduces the dangers, reduces with safety the damage to the machine from striking an obstacle and as well is simply and efficiently constructed.

Improvements over a machine of the hereinbefore named art are suggested to solve the problems, in that a latching mechanism is provided on the carrying beam which contains a prestressed spring member with an intermediate member that projects into a latch pocket into which a pivotable latch interlocks.

In one preferred embodiment the spring is positioned parallel to the carrying beam, with the latch pocket located on the opposite side of the carrying beam from the spring and perpendicular to it, so that the spring is connected by means of a flexible chain and a bar with the latch pocket interlocking latch.

It is also possible to so arrange the spring that it extends perpendicular to the carrying beam, so that it also here by the force of the spring exerted on an intermediate linking member of the spring moves the latch into the latching pocket.

In another embodiment of the invention the spring on the carrying beam may be arranged at an angle to horizontal.

It is especially advantageous to have a pull cord affixed to the latch interlocking into the latch pocket.

The latch pocket can comprise two opposing openings through which the latch extends where it is by bias of a self contained spring forced into a closure position in the latch pocket.

In accordance with this invention also, the carrying beam by means of the prestressed spring and a coupled intermediate linking member is automatically shoved into the latching pocket by swinging the mower into working position, so that the latch also automatically locks. Because the latch is affixed to a pull cord, the driver may unlatch the apparatus without leaving his seat.

The bias of the spring which works with the intermediate linking member is selected large enough that the mower under normal condition is held in place without changing its work position. When striking an obstacle the mowing device can in a known way swing back, whereby the bias of the spring increases. If as is mostly the case a small obstacle is encountered, then the mowing device will by means of the spring bias overcome this obstacle and automatically swing back again into its normal working position so that no interruption of the mowing effort is required.

If a larger obstacle is encountered, that the mower itself cannot overcome, then the driver can intervene by a short tug on the pull cord and unlock the latch of the latching equipment to swing back the mower into its transport position. Upon the following swing back to the working position as above described, the latching is automatic.

The mower afforded by this invention has the advantage that by means of the biased intermediate link member the arrangement for normal drive is essentially preserved. At the same time a damping of the lurches in the driving direction and in each evasion maneuver results which increases the life span of the machine.

THE DRAWING

Figure 6:
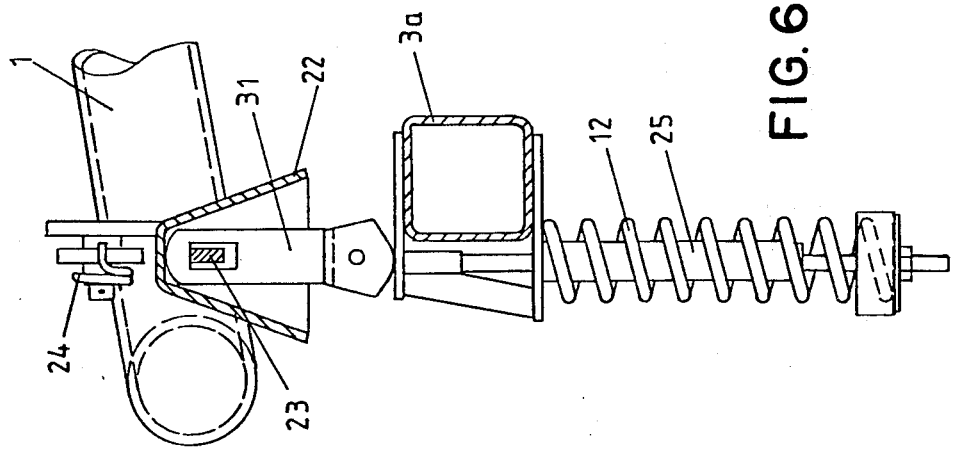

In the following description the invention is further clarified by reference to preferred embodiments set forth in the drawings. There is shown in:

FIG. 1, a side view of a mower in its working position,

FIG. 2, a top view of the mower in its working position,

FIG. 3, an enlarged portion of a latching mechanism afforded by the invention,

FIGS. 4 and 5, two further examples of latching mechanisms,

FIG. 6, another working embodiment in side view,

FIG. 7, this working embodiment in top view, and

FIG. 8, a further working embodiment afforded by the invention.

THE PREFERRED EMBODIMENTS

Shown in the mower of FIGS. 1 and 2 is the hitching mount 1 for towing by a not shown tractor, which is attached at the vertical pivot axis 13. About this pivot axis a rotatable carrying mount beam is disposed which e.g. comprises two telescoping parts 3a and 3b. The parts 3a and 3b can be secured by means of bolt 17.

A mower support mount beam 4, shown in its working position during tow by a tractor, is positioned behind and under the carrying mount beam. The mower support mount beam 4 is coupled to the outer part 3b of the carrying beam by means of a carrying sleeve 15. The pivot point 14 for the pendulum action of the mower support beam lies within this beam. The mower support mount 4 in a usual manner carries a mowing device, of which two are shown. A drum designated 5 with two anatropous rotating cutting plates 6 including knives and two gliding plates 7. The cutting plates are in a known manner driven by a flexible axle 9 by means of an angular drive device 32 that is attached by a coupling 18 to the plug in drive axle of the tractor.

In FIG. 2 is shown the power connection 18 in its working position. By 19 is shown the power connection in its transport position, e.g. for the connection of a separate apparatus.

As shown in FIGS. 1 through 7, the latching mechanism according to this invention has a spring member parallel to the carrying mount 3a, that for example comprises a spiral spring 12 that is arranged with a bushing that contains inside it a sliding rod and couples with a flexible chain 26. The chain passes over a guide roll 21 and through the carrying mount 3a by an opening 27 and extends to a bushing on which it is attached. The sliding rod is held by means of a nut on the spiral spring 12 surrounding bushing. On the opposite side of the carrying mount 3a from the spring element is simply located a gripping pocket 22 with a conical opening in which a connecting member 31 can mate with an opening. The gripping pocket 22 is supplied with two opposing openings 30 which can be gripped by a locking latch 23 located on the hitching mount 1 and biased by a self contained spring 24 so that it passes through the opening in the connecting member 31 and locks it in place. This automatically occurs whenever the mower is swung into its working position.

FIGS. 3, 4 and 5 show a particular latching mechanism of the invention in enlarged scale. It will now become clear that as soon as the mower strikes an obstacle, the mower support mount 3a can swing back against the force of the spring 12 in order to overcome a certain small obstacle as the sping compresses and the chain 26 passes over roller 21. When the obstacle is overcome then the carrying mount 3a automatically swings back again in the normal working position by means of the force of spring 12. An interruption of the mowing is thus not necessary.

In case the obstacle is somewhat larger, or the mower is to be swung into its transport position, the driver from his seat on the tractor pulls the cord 29 that is affixed to the latch 23. This permits the driver without leaving his place to remove the latch 23 out of the openings 30 of the gripping pocket 22 as well as the opening in the connecting member 31, so that the mower can swing into its transport position, whereby this return swing also follows opposite the influence of spring 12 so that no violent blow upon the impact into the final position results.

FIGS. 6 and 7 show another embodiment of the latching mechanism, which here is arranged perpendicular to the carrier mount 3a. This construction is simpler since it omits a chain and roller. However, similar parts with similar illustrations are provided.

FIG. 8 shows a further embodiment of the invention, in which the latching mechanism is directed at an angle to horizontal of the carrying mount 3a. This construction is especially advantageous for a mower which is perpendicularly mounted upward in order to transport.

By means of the spring biased latching apparatus a mower of this invention will be essentially used in normal drive and at the same time the mower speed can be raised, since particularly the machine overcomes small obstacles without difficulty. Furthermore the lurching in the driving direction for each avoidance maneuver required by ordinary mowers is eliminated.

We claim:

1. A mower comprising in combination, a mower support mount for carrying at least one rotating mowing device on its underside, a support mount carrying beam pivotable between a mowing position and a transport position, a hitching mount for coupling the mower carrying beam to traction means for moving the mowers forward with the traction means, a flexible coupling arrangement on the carrying beam for biasing the mower support mount resiliently toward its mowing position, and comprising a prestressed spring element for said biasing of the mower toward its working position coupled for flexibly permitting the mower support mount to move away from the mowing position when striking an obstacle and to swing back after the obstacle is overcome and to absorb blows when the mower is returned to its transport position by said carrying beam, and a latching mechanism for attaching the carrying beam to the hitching mount to retain it in the mowing position comprising a clasping pocket on the hitching mount for receiving a connecting member on the carrying beam and a locking member for locking the mower into the mowing position and pull cord means permitting a traction means operator to unlatch the carrying beam to return it to the transport position, and means for positioning the spring element parallel to the carrying beam, means for positioning the clasping pocket perpendicular to and on the opposite side of the carrying beam from the spring, and means for coupling the spring element to the locking member in the clasping pocket by means of a flexible chain connected to said connecting member.

2. A mower according to claim 1 further comprising, two opposed openings defined in the clasping pocket arranged for the locking member to extend therethrough, and spring means biasing the locking member to urge it in a locking position extending through the two openings.

* * * * *